US008094819B1

(12) United States Patent
Limondin et al.

(10) Patent No.: US 8,094,819 B1
(45) Date of Patent: Jan. 10, 2012

(54) METHOD AND APPARATUS FOR HIGH AGILITY CRYPTOGRAPHIC KEY MANAGER

(75) Inventors: Philippe M. T. Limondin, Cedar Rapids, IA (US); T. Douglas Hiratzka, Coralville, IA (US); Mark A. Bortz, Robins, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1330 days.

(21) Appl. No.: 11/495,961

(22) Filed: Jul. 28, 2006

(51) Int. Cl.
*H04N 7/167* (2006.01)
*G06F 12/00* (2006.01)

(52) U.S. Cl. ........ 380/228; 713/187; 713/189; 711/149; 711/152; 711/170

(58) Field of Classification Search .................. 380/264, 380/45, 228
See application file for complete search history.

(56) References Cited

U.S. PATENT DOCUMENTS

| | | | | |
|---|---|---|---|---|
| 4,731,840 A * | 3/1988 | Mniszewski et al. | ......... | 380/284 |
| 5,200,999 A * | 4/1993 | Matyas et al. | ............... | 380/277 |
| 5,329,623 A | 7/1994 | Smith et al. | .................... | 395/275 |
| 6,201,755 B1 * | 3/2001 | Pillar et al. | ............... | 365/230.01 |
| 6,523,102 B1 * | 2/2003 | Dye et al. | ...................... | 711/170 |
| 2005/0213603 A1 * | 9/2005 | Karighattam et al. | ........ | 370/463 |

* cited by examiner

*Primary Examiner* — Taghi Arani
*Assistant Examiner* — Mohammad L. Rahman
(74) *Attorney, Agent, or Firm* — Donna P. Suchy; Daniel M. Barbieri

(57) ABSTRACT

A method and apparatus for improved algorithm and key agility for a cryptosystem, comprising a CAM-type key manager. The key manager uses two memories, an index RAM and a key RAM, to virtualize each algorithm or key using pointers from the index RAM to the key RAM, allowing simple reference to algorithm/key pairs, and to dynamically allocate storage for keys. An autonomous free memory management design improves latency in future key write operations by transforming the search for free location addresses in the key RAM memory into a background task, and employing a free address stack. The index RAM is resizable so that data for a plurality of cryptographic algorithms may be stored dynamically.

8 Claims, 6 Drawing Sheets

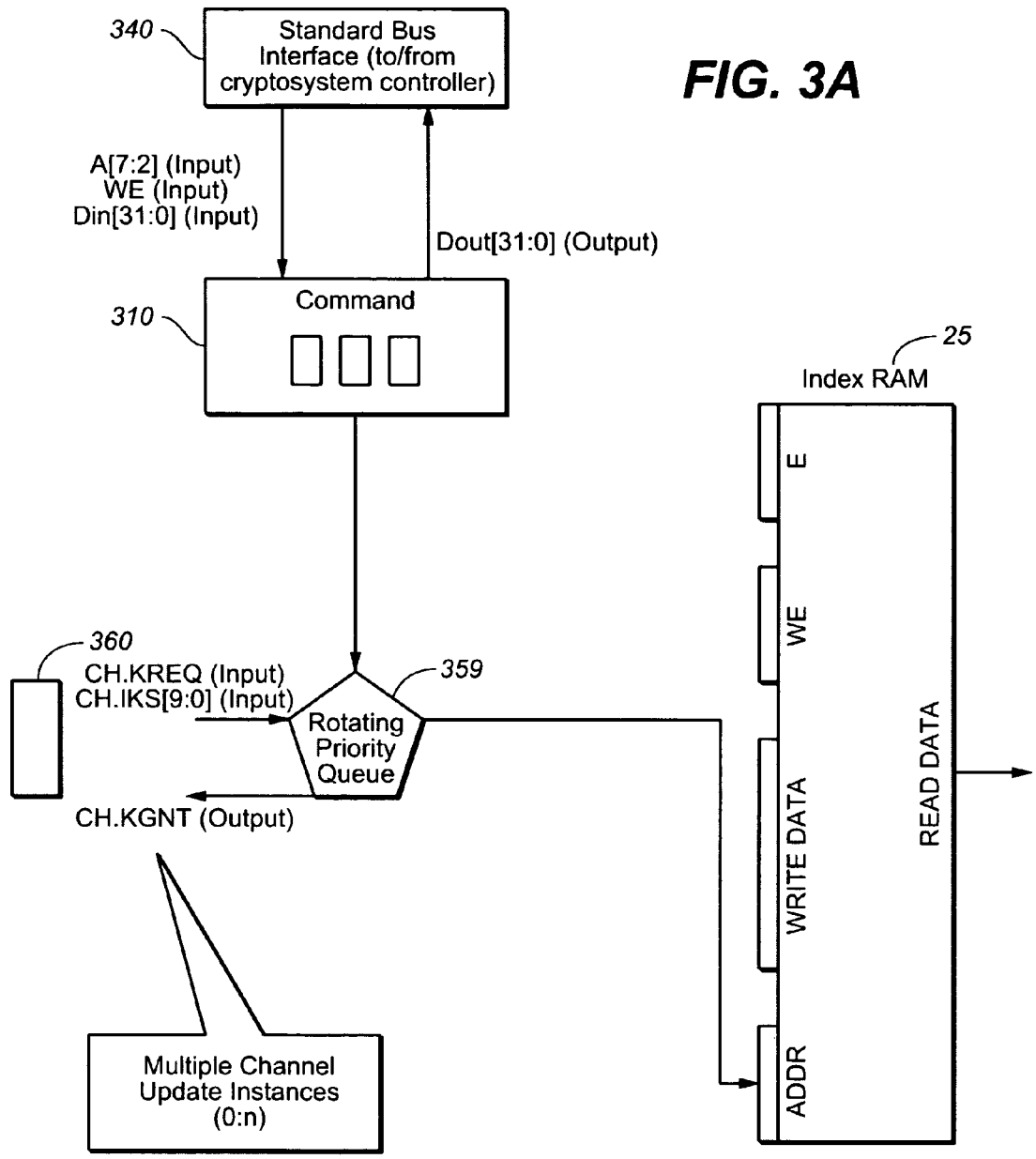

METHOD AND APPARATUS FOR HIGH AGILITY CRYPTOGRAPHIC KEY MANAGER

CROSS-REFERENCE TO RELATED APPLICATIONS

Commonly assigned, non-provisional U.S. patent application Ser. No. 10/616,199, filed Jul. 9, 2003, entitled "Method And System For Cryptographic Processing" and listing as inventors D. Jensen, M. Bortz, and T. MacDonald refers to a first generation encryption architecture which uses static key maps; and, commonly assigned, non-provisional U.S. patent application Ser. No. 11/227,682, filed Sep. 15, 2005 entitled: "High Speed Data Encryption Architecture"; listing as inventors Mark A. Bortz, Philippe M. T. Limondin and T. Douglas Hiratzka is the advanced cryptographic processing architecture which can use the high speed algorithm and key agility provided by the present disclosure, all incorporated by reference herein.

BACKGROUND OF THE INVENTION

1. Field of Invention

The present invention relates generally to the field of computing systems and particularly to high speed data encryption.

2. Description of Related Art

Military and commercial computing, communication and navigation products often require high speed encryption and decryption of data. The Programmable Cryptography Processor (PCP) architecture, as disclosed in U.S. patent application Ser. No. 10/616,199, has been developed by Rockwell Collins to address the security needs of several military products. The PCP provides a fully configurable, non-classified encryption core that supports a variety of legacy and modern algorithms.

Future systems using modern algorithms may have throughput requirements much greater than the current capabilities of the PCP design. Coinciding with these high speed data requirements, modern cryptosystems require support for running multiple concurrent algorithms each with its own unique set of cryptographic keys. Algorithm and key agility also requires that the process of switching and reloading of algorithms and keys be transparent. Current approaches require the user to pre-allocate blocks of key storage per algorithm, creating a static key map for a given system. The present invention provides a method and apparatus that is more flexible.

Content Addressable Memory (CAM), also known as "associative storage," is typically memory hardware which receives input search data, in the form of a word, to be compared, bit by bit, against stored data held in the CAM, with the address of any matching data returned in a single clock cycle, rather than having to transfer data to an arithmetic logic unit (ALU) in more than one cycle, as in conventional memory. The speed of a CAM is achieved at the expense of increased silicon die hardware and power consumption. A typical CAM has a search word (N-bits per word) broadcast into searchlines in the CAM, which address $2^n$ bits of address space in the CAM, e.g. $2^{15}=32K$ entries. The CAM has stored words that have a matchline to indicate whether each stored word in the CAM is identical or not to the search word. A simple encoder, in the case where a single match is expected, or a priority encoder, in the case where multiple matches are expected, is used to indicate the address location of the match in the CAM. Typical applications of CAM, combined with RAM, are in network routers to forward data packets from an incoming port to an outgoing port using an address-lookup table. Other applications include Huffman coding/decoding, image coding and Lempel-Ziv compression of data.

In the present invention, to provide the flexibility required for algorithm and key agile cryptographic systems, a novel approach is disclosed to creating a virtualized cryptographic key cache that behaves as a type of CAM.

SUMMARY OF THE INVENTION

The present invention accomplishes two major tasks in a cryptographic system involving cryptographic algorithms and keys: 1) it virtualizes each algorithm's key management, allowing simple reference to algorithm/key pairs, and 2) it dynamically allocates storage for keys as they are added or removed from the cryptosystem.

The present invention uses a type of CAM to implement its design, termed the cRAM cryptographic key manager. The general design principle of the cryptographic core virtual key management of the present invention is the use of two memories to store the virtual key contents dynamically, which in combination behave as a type of CAM. The first of these memories acts as an index RAM containing the virtualized addresses (pointers) of where the cryptographic keys are being stored. A second memory contains the keys themselves (the values) stored in RAM, and is addressed by the result of the index RAM portion of the two-stage design. As keys are added to or deleted from the system, the index RAM memory will allocate new locations in the key RAM memory based on availability. This approach allows the system to contain only the number of keys necessary for a given channel, reserving any remaining space for other channels. The order and location of keys in the key RAM are not dependent on any static pre-allocation of blocks, but rather the dynamic allocation of keys as they are added to or deleted from the system.

Further, in an instantiation of the present invention, a cRAM cryptographic key manager is disclosed that uses a rotating priority queue for key registers to achieve low latency prioritized command requests, and a secondary rotating priority queue to arbitrate multiple concurrent input controls to the cRAM cryptographic key manager. In addition, the invention uses an autonomous LIFO controller employing PUSH/POP for free memory control.

The sum total of all of the above advantages, as well as the numerous other advantages disclosed and inherent from the invention described herein, creates an improvement over prior techniques.

The above described and many other features and attendant advantages of the present invention will become apparent from a consideration of the following detailed description when considered in conjunction with the accompanying drawings.

BRIEF DESCRIPTION OF THE DRAWINGS

Detailed description of preferred embodiments of the invention will be made with reference to the accompanying drawings. Disclosed herein is a detailed description of the best presently known mode of carrying out the invention. This description is not to be taken in a limiting sense, but is made merely for the purpose of illustrating the general principles of the invention. The section titles and overall organization of the present detailed description are for the purpose of convenience only and are not intended to limit the present invention.

Figure 1:
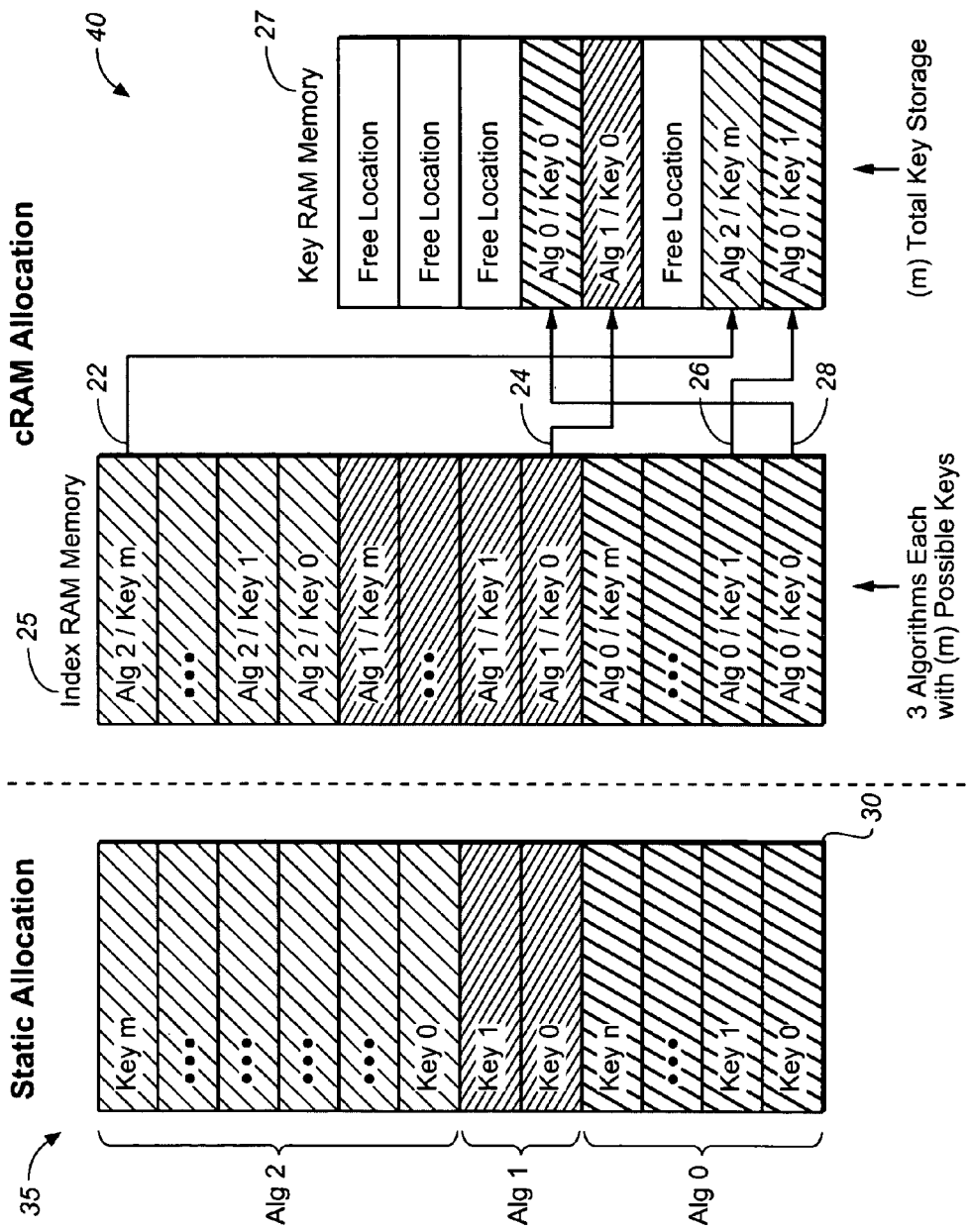
FIG. 1 (A and B) is a comparison of the present invention system versus a prior system of key storage for a cryptographic algorithm.

It should be understood that one skilled in the art may, using the teachings of the present invention, vary embodiments shown in the drawings without departing from the spirit of the invention herein.

DETAILED DESCRIPTION OF THE INVENTION

The method and apparatus of the present invention may be hardware that is hardwire programmed to perform the functions outlined herein (e.g., an ASIC), hardware running firmware, or hardware running software (e.g. an FPGA), with the software existing in memory, and which may be written in any computer language (such as C, C++, Perl, Java or the like), and the further, and/or in the alternative, the software may be run by a computer system having an operating system. Further the present invention may be implemented in an FPGA having one or more memories.

Turning attention to FIG. 1, the strength of the dynamically sizeable, dynamic key allocation method of the cRAM cryptographic key manager allocation system of the present invention is shown by comparisons with a previous static allocation system. A prior static allocation system using fixed pre-allocated blocks of memory is shown on the left-hand side (of the dotted line) at 35 in FIG. 1. The prior static allocation system requires the designer to pre-allocate portions of key memory for each particular algorithm. In the illustrative example shown on the left-hand side of FIG. 1, 'n' keys for Algorithm 0 are pre-allocated, two (2) keys for Algorithm 1, and 'm' keys for Algorithm 2. In the event of an algorithm agile load requiring the system to swap out Algorithm 1 for a new algorithm, the new algorithm would be limited to the pre-allocated storage that preceded it, namely only two (2) key locations. This allows no flexibility for algorithm agility.

By contrast, the cRAM cryptographic key manager approach of the present invention uses two memories, an index RAM 25 and a key RAM 27, and allows each algorithm to store up to a maximum number of system allowable keys (denoted by 'm' in the example of FIG. 1, at right hand side 40). As each key is added to the system, it is dynamically assigned a location in the key RAM 27. For instance, it is seen in FIG. 1 at 22, 24, 26, 28 that four (4) keys have been added to the system. They are all addressed by index RAM 25 memory, and dynamically located in the key RAM memory 27. As new keys are added, they will replace the "free locations" until the key memory is full. Thus the present invention allows for a resizable allocation of keys for each algorithm, rather than being limited to a fixed number (up to the system allowable maximum 'm', which is limited by the size of the index RAM).

Thus FIG. 1 shows the new cryptographic core allocation scheme of the present invention compared to that of prior static allocation schemes. Prior allocation systems had a fixed key space, defined in the figure conceptually by height of the RAM 30 on the left-hand side 35 (left of the dotted line) in FIG. 1. In prior systems one had to pre-partition the RAM for each algorithm and key set. By contrast, in the present invention as exemplified by the right hand side 40 of FIG. 1, the two RAMs act in conjunction as an index and storage. The left side, index RAM memory 25, contains entries for up to the maximum number of keys for any algorithm. In this case, algorithms 0-2 can each have up to (m) maximum keys in the system. The RAM on the right side, key RAM memory 27 in FIG. 1, is the actual storage, which only has (m) total locations. In reality, in practice, all three algorithms shown in the figure cannot all fully allocate all their keys. Thus the index RAM memory 25 is typically larger than the key RAM memory 27. An analogy in everyday experience might be "overbooking" the seats on an airplane flight. However, this overbooking problem is a problem left to the designer of the system and does not affect the operation of the present invention. The total storage for the keys in the architecture of the present invention is defined by the max size of the key RAM 27. As key RAM gets larger, it more directly approaches a direct mapped single RAM solution. The advantages of the present architecture come from the smaller sizes and conceptual overallocation or "overbooking", as explained herein.

Thus the present invention can address up to (m) possible states until it fills in the key RAM memory 27. If a key/algorithm, say key/algorithm 1, was now removed from the index RAM memory 25, the memory freed by the key/algorithm deletion, up to its full (m) maximum keys, can be allocated to a new or existing key/algorithm in the index RAM memory 25, and subsequently to the key RAM memory 27, so long as space remains in the key RAM memory 27, subject to the overallocation/"overbooking" memory limitation discussed above. The ability of the index RAM memory 25 working with key RAM 27 to flexibly allocate storage for keys in an algorithm can be termed algorithm agility, which is a consequence of the resizable allocation of memory via index RAM 25 as taught herein.

Thus the general design principle of the cRAM cryptographic key manager virtual key management design is the use of two memories to store the virtual key contents dynamically, which in combination behave as a type of CAM (content addressable memory). Though two memories are shown as physically distinct memories in the drawings of the present invention, it is possible that a single physical memory that is partitioned into two memories may also be employed. Further, any type of memory may be used and is synonymous with RAM (random access memory), though faster RAM, such as SRAM, is preferred. No special memory requirements are assumed for the present invention; thus any RAM based storage is acceptable, and any type would function adequately (e.g., SRAM, dual-port RAM and the like). However it is advisable that the two memories have similar timing characteristics; absent this, the system of the present invention will run at the speed of the slowest memory. In addition, keys in the present invention could include not only secret keys, public and private keys and key fingerprints such as used by AES, RSA, DES, El Gamal, and the like, but the algorithms and parameters associated with these cryptographic keys (i.e., cryptographic data, which herein is used synonymously with cryptographic key and key data).

The first of these two memories, index RAM 25, acts as an index RAM containing the virtualized addresses (pointers) where the cryptographic keys are being stored. The second memory of the two memories, key RAM 27, contains the keys themselves stored in RAM, and is addressed by the result of the index RAM portion of the two-stage design. As keys are added to or deleted from the system, the index RAM memory will allocate new locations in the key RAM memory based on availability. This approach allows the system to contain only the number of keys necessary for a given channel, reserving any remaining space for other channels. Note the terms channel and algorithm are essentially synonyms, as most channels will have their own unique algorithm. The order and location of keys in the key RAM are not dependent on any static pre-allocation of blocks, but rather the dynamic allocation of keys as they are added to or deleted from the system. The cRAM cryptographic key manager implementation of a preferred embodiment of the present invention, which may be termed a cryptographic core, or encryption core, in a preferred embodiment uses an 8196×10 index RAM supporting eight concurrent channels each with up to 1024 keys. The key RAM provides 1024 storage locations, for the maximum number of system allowable 256-bit keys.

As each key is added to the system, it is dynamically assigned a location in the key RAM. Each key is addressed by the index RAM memory, and dynamically allocated to the key RAM memory. As new keys are added, they will replace the "free locations" until the key memory is full.

Virtualization occurs because the cryptosystem issues an address represented by the channel and key select, and is not responsible for keeping track of where the keys are stored in the key RAM memory. Channels may allocate keys so long as free locations remain. Thus virtualization occurs whereby the cryptosystem user (e.g. a microprocessor, such as a cryptographic microprocessor, coprocessor or controller) issues an address represented by the algorithm/key pair and need not keep track of where the keys are stored in the key RAM memory, only the index RAM memory need be addressed. The index RAM of the present invention is a simple random access memory (Address input, Data input/output). If an algorithm were to be replaced, the new algorithm may allocate keys so long as free locations remain and is not limited by any previous decisions based on the algorithm that preceded it.

The control interface of the cRAM cryptographic key manager design allows the user (e.g. a cryptographic processor) to issue commands such as READ, DELETE, WRITE, and ZEROIZE to the memories to comply with cryptographic requirements. These cryptographic core commands can be summarized by the following table:

| Command | Description |
| --- | --- |
| READ | Read key entry from cRAM based on Algorithm/Key pair |
| WRITE | Add entry to index RAM, allocate to free location in key RAM |
| DELETE | Delete entry from index RAM, free location in key RAM |
| ZEROIZE | Zeroize all cRAM entries, leave all locations free |

Further, in the present invention, automatic fault detection will trigger if certain illegal events occur. These include reading of algorithm/key pairs that have not been loaded yet, writing new algorithm/key pairs that already have an entry, and attempting to add an algorithm/key pair when no free locations remain in the key RAM.

Figure 2:
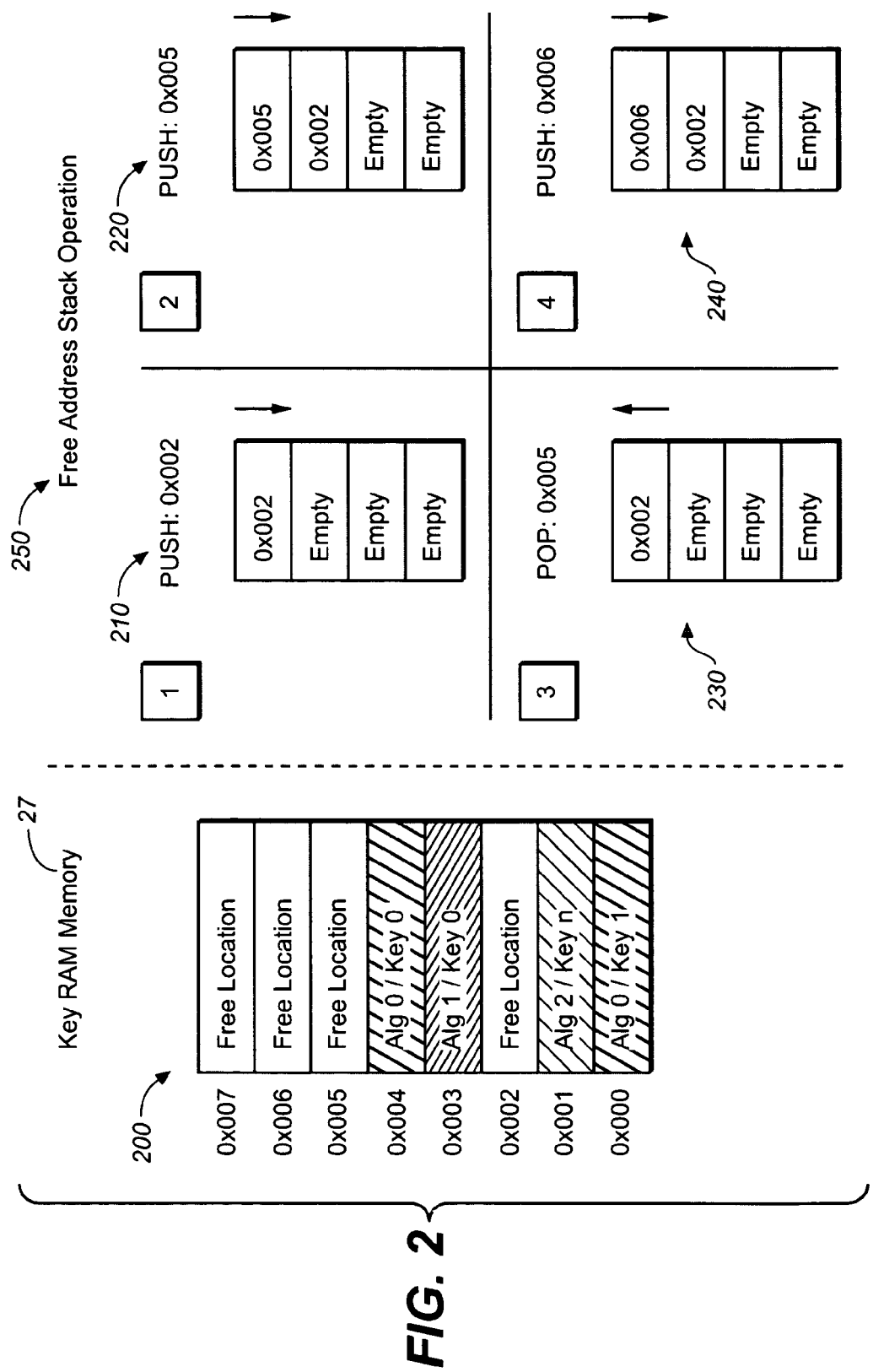
FIG. 2 is a block diagram showing the operation of the free address stack operation unit of the present invention.

Turning attention to FIG. 2, there is shown a block diagram description of the free address stack operation unit of the Cryptographic Key Manager of the present invention. In previous systems, such as described above in connection with the prior static allocation system using fixed pre-allocated blocks of memory as shown on the left-hand side 35 of FIG. 1, the handling of free locations in the key RAM was left as a user level task (e.g. for the designer, or for the processor running the prior static allocation system shown on the left side 35 of FIG. 1). Allocation of new keys required scanning the key RAM for a free location, and using the resulting location as the storage for the new cryptographic key. In these previous systems, even for a key RAM of nominal depth, a worst-case scan is costly in terms of latency and not optimal for a high speed cryptosystem such as which is disclosed in non-provisional U.S. patent application Ser. No. 11/227,682, filed Sep. 15, 2005 entitled: "High Speed Data Encryption Architecture", listing as inventors Mark A. Bortz, Philippe M. T. Limondin and T. Douglas Hiratzka, incorporated by reference herein.

By contrast, in the present invention, the proposed autonomous free memory management design resolves the latency issue by transforming the free location scan into a background task, either in a multitasked environment or while a controller is idle during periods of inactivity in the cRAM cryptographic key manager unit, filling a free address stack for availability in future key write operations. It can be seen upon inspection of FIGS. 1 and 2 that as the contents of the cryptographic core key storage get full, the user (e.g. the processor using the cryptographic core of the present invention) will incur an increasingly longer latency to determine the location of the next free address, which is undesirable at the system level.

Therefore, the cryptographic core autonomous free memory management design alleviates the latency incurred in manually scanning the key RAM by performing a free location scan as a background task. During periods of inactivity in the cRAM unit (i.e., no active READ, WRITE, DELETE, ZEROIZE commands), an autonomous control unit will scan the key RAM for unused locations and store the results in a stack structure. These results will be immediately available for future allocation.

Stack architectures act as a LIFO (last in, first out) storage, by which dataflow may be controlled via abstract PUSH and POP operations. Such PUSH AND POP operations are known per se in the art, with PUSH and POP being instructions that store and retrieve an item on a stack, the stack being a set of hardware registers or a reserved amount of memory used to keep track of internal operations. PUSH enters an item on the stack, and POP retrieves an item, moving the rest of the items in the stack up one level. The stack architecture has the advantage of being a simple, compact structure with implicit addressing. The next free location is always available at the top of the stack. The autonomous free memory controller automatically manages the free address stack via internal PUSH/POP commands.

Thus, referring to FIG. 2, the autonomous Free Location Stack Operation architecture of the present invention is described. On the left side of FIG. 2 (left of the dotted line), at 200, there is shown simple key RAM contents, showing free memory locations at addresses 0x002, 0x005, 0x006, and 0x007, labeled "free location". Using a manual scan approach, the latency incurred by the processor to determine the address of the first free location would be three (3) reads. Assuming an intelligent controller, the next scan would take three (3) reads to traverse the key RAM from locations 0x002 to 0x005. Such latency puts a heavy burden on the system by which the user/microprocessor must constantly perform manual scans before each WRITE, each with a potentially long latency.

By contrast, in the present invention, an autonomous controller takes advantage of any idle periods of operation and scans the contents of the key RAM in anticipation of future WRITE commands. Once a free location has been identified, the controller will PUSH the address onto the free address stack (FIG. 2, inlay 1 at 210). As the system remains idle, the autonomous controller will continue to seek free locations, and PUSH more addresses onto the free address stack (FIG. 2, inlay 2 at 220). When a WRITE command is issued, the top entry in the stack (0x005) is immediately available to be committed to the index and key RAMs, and the WRITE command may be completed with no accrued delay. Thus, once the WRITE is complete and the command executed, the system will POP the top entry off the stack (FIG. 2, inlay 3 at 230), returning the system state to idle, and allowing the autonomous controller to continue filling the stack (FIG. 2, inlay 4 at 240), e.g. with another free address (0x006).

Such autonomous operation greatly improves performance by taking the scan latency out of WRITE operations. The dedicated controller takes advantage of the cRAM cryptographic key manager architecture, by continually passing through and scanning the key RAM memory to account for new free locations. Since the storage of data in the key RAM is order independent (virtualized), the controller may also take advantage of the DELETE command, and automatically add deleted addresses to the free memory stack, without the need for a scan of the key RAM.

By using autonomous scan during idle periods and automatically adding newly DELETEd items to the free memory stack, the cryptographic core will incur minimal latency during WRITE operations.

Figure 3B:
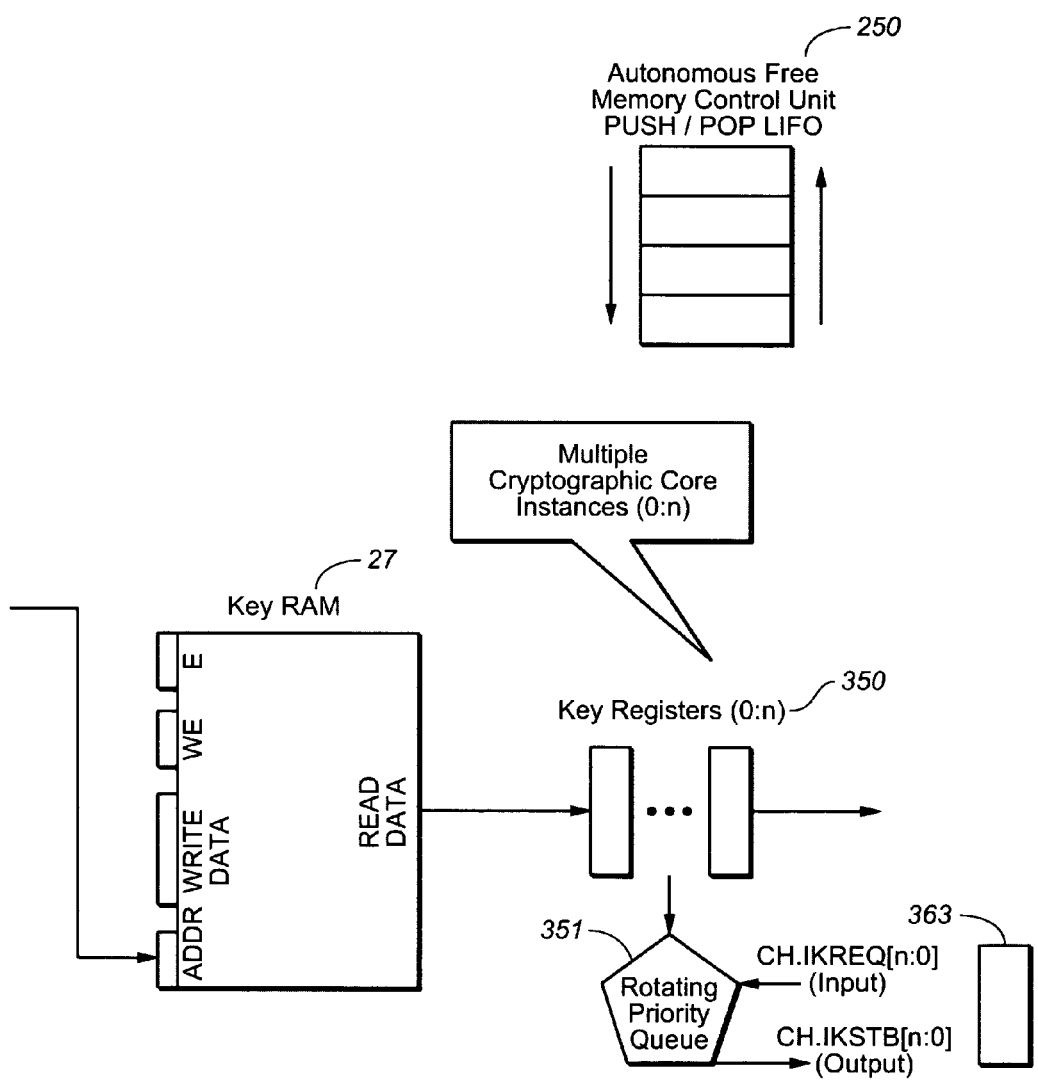
FIG. 3 (A and B) is a general block diagram of the present invention

Turning attention now to FIG. 3, there is shown a top level block diagram of the cRAM cryptographic key cache, a particular hardware instantiation of the architecture outlined by the present invention. The hardware instantiation of FIG. 3 is but one specific example for a cryptographic key manager according to the teachings herein, for a particular cryptographic or encryption core design, and is not to be taken as limiting. For example, the depth and width of the associated memories are completely configurable. The implementation of a CAM (content addressable memory) inspired memory manager for the cryptographic realm is dubbed the cRAM. The cRAM virtual key management design (key manager) block diagram is shown in FIG. 3 (parts A and B).

In FIG. 3, there is shown a top level block diagram for the present invention. The index RAM 25 is linked to a key RAM 27 as taught herein, and receives commands and data from a cryptosystem controller from the left hand side, at command bus interface 310 and Rotating Priority Queue 359 interacting with UPDATE interface 360, and outputting data to a cryptographic processing core on the right-hand side, at key registers 350. Bus interface 340 to the command bus interface 310 is a standard bus interface to and from a cryptosystem controller, having for example 8 bits for addresses and 32 bits for data, and receives commands such as READ, WRITE, DELETE, ZEROIZE, as well as containing the cRAM read and write interfaces from the cryptographic controller. When multiple channels are present, as is typical and preferred, a rotating priority queue 359 arbitrates which channels will be serviced first, with multiple channel update UPDATE instances (0:n) for a plurality of channels, duplicated "n" times for the "n" channels. Rotating priority queue 359 receives commands, from each of the "n" channels, in an implementation specific manner, such as CH.KREQ, CH.IKS, CH.KGNT (e.g., key request, input key select, and key grant respectively) from an UPDATE interface 360, and arbitrates which of the multiple channel UPDATE requests (i.e., signaling when a new key needs to be updated for processing by a particular channel) and command requests (i.e., READ, WRITE, DELETE, ZEROIZE) will be serviced first. Index RAM 25 and Key RAM 27 have ADDR, WRITE DATA, WE and E registers that correspond to one another. The symbols are defined as follows: E is a RAM enable signal; WE is a write enable signal; Write Data is the input data to the index RAM for new algorithm/key pairs. One uses writes to the index RAM when using a new WRITE command, or a delete command to erase the pointer, or finally a ZEROIZE to erase the pointers associated with one entire channel. ADDR is the addressable pointer in the index RAM. If one concatenates the algorithm/key values one generates the address for the index RAM. The data at this location is the pointer to the key itself in the key RAM.

Data is output at key registers 350, which support multiple cryptographic core instances, and support "n" channels, (0:n) An autonomous free memory control unit 250, as explained herein in connection with FIG. 2, indicates free locations in the key RAM 27. Much like the rotating priority queue (359), the output data for the multiple cryptographic core targets is arbitrated by a second rotating priority queue, 351 in FIG. 3B, which takes the key registers and services the highest priority core request for a new key, which can be interfaced by an interface 363.

Figure 4:
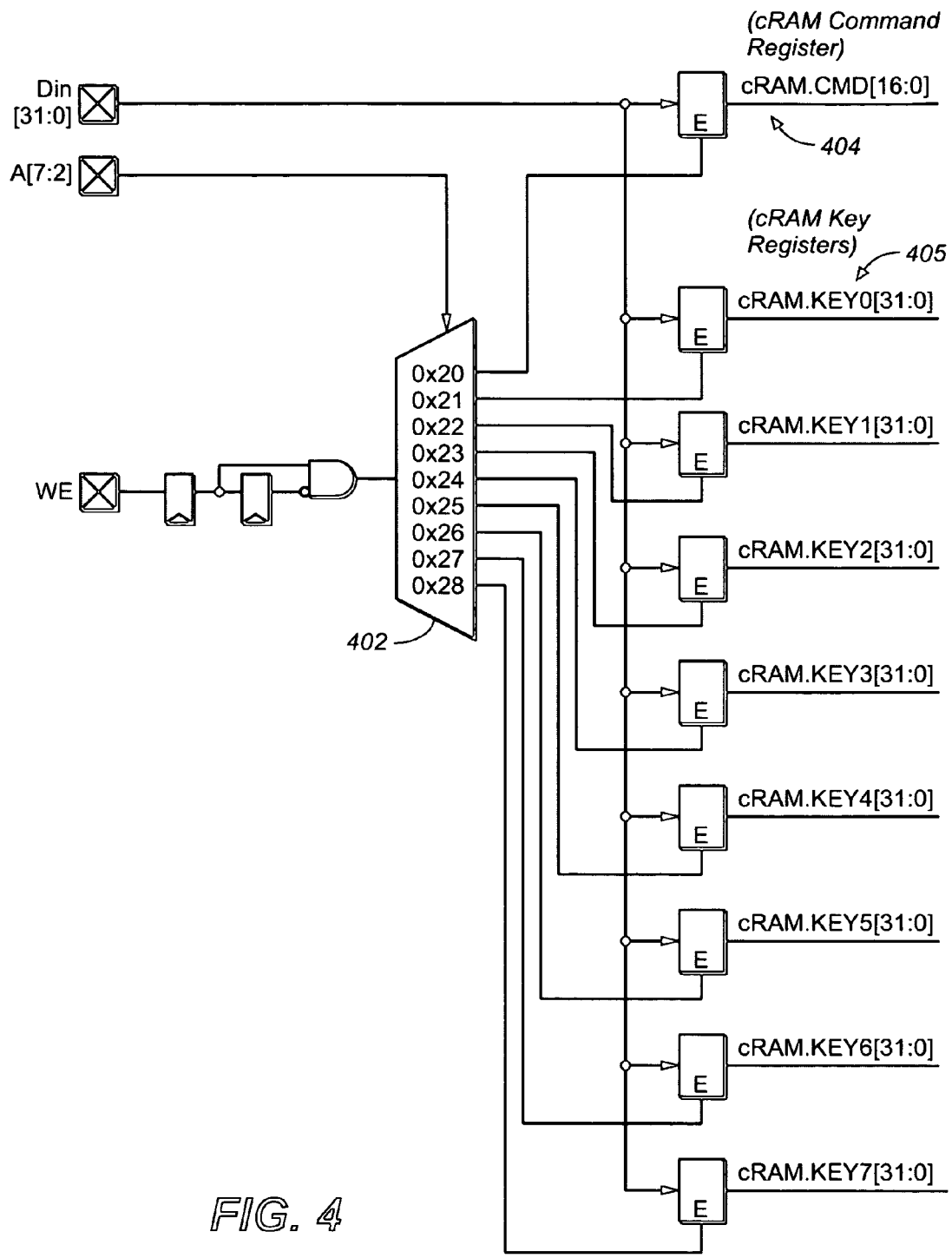
FIG. 4 is a diagram of the cRAM Write Interface for the present invention.
Figure 5:
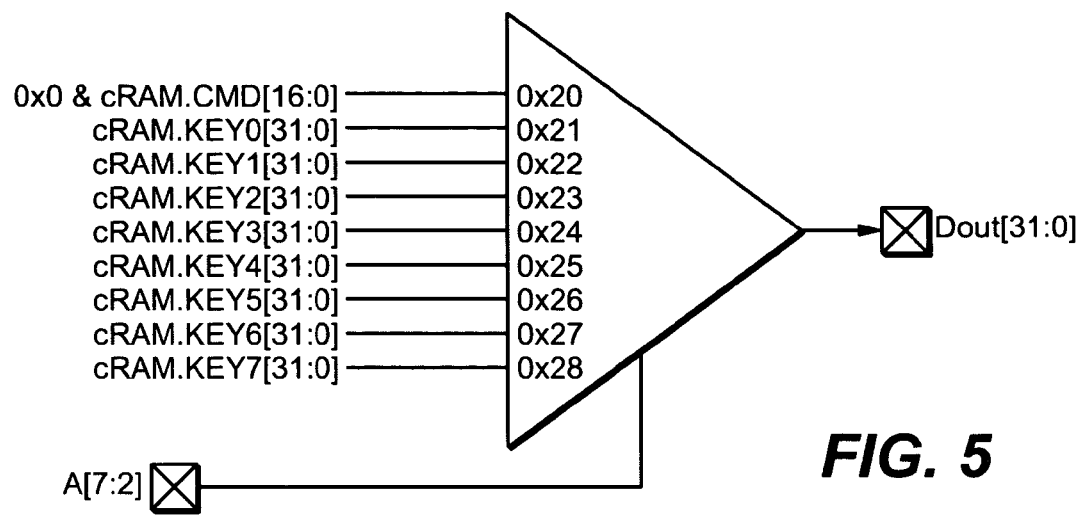
FIG. 5 is a diagram of the cRAM Read Interface for the present invention.

Now turning attention to FIGS. 4 and 5, the cRAM Write Interface (FIG. 4) and cRAM Read Interface (FIG. 5) circuitry are shown. The cRAM read and write interfaces are part of the cRAM command interface 310 in FIG. 3 The cRAM command interface is used to issue READ, WRITE, DELETE, or ZEROIZE key management commands. These key management commands are issued by the external cryptosystem, e.g., an external microprocessor, controller, and the like. Two sets of registers are provided, the first defining the key management commands, and the second providing key storage for READ and WRITE commands.

The cryptographic core registers may be read from or written to using a well-defined simple standard bus interface, using Address, Data, and Write enables, as is well-known per se to circuit designers. All registers are memory mapped as 32-bit registers, so address bits A[1:0] are not present. The command interface consists of address A[7:2], input data Din[31:0], write enable WE, and output data Dout[31:0], which are labeled as such in FIGS. 4 and 5.

The cRAM memory map is presented in the following table. The name in the name column in the table below is an implementation specific naming scheme, but in general could be any naming convention; likewise the addresses are implementation specific to the particular hardware instantiation of the present invention, and originate at 0x20, but in general could be any address.

| Name | A[7:2] | R/W | Description | Reset State |
| --- | --- | --- | --- | --- |
| cRAM.CMD | 0x20 | R/W | cRAM Command Register | 0x00000000 |
| cRAM.KEY0 | 0x21 | R/W | cRAM Key Register bits [31:0] | 0x00000000 |
| cRAM.KEY1 | 0x22 | R/W | cRAM Key Register bits [63:32] | 0x00000000 |
| cRAM.KEY2 | 0x23 | R/W | cRAM Key Register bits [95:64] | 0x00000000 |
| cRAM.KEY3 | 0x24 | R/W | cRAM Key Register bits [127:96] | 0x00000000 |
| cRAM.KEY4 | 0x25 | R/W | cRAM Key Register bits [159:128] | 0x00000000 |
| cRAM.KEY5 | 0x26 | R/W | cRAM Key Register bits [191:160] | 0x00000000 |
| cRAM.KEY6 | 0x27 | R/W | cRAM Key Register bits [223:192] | 0x00000000 |
| cRAM.KEY7 | 0x28 | R/W | cRAM Key Register bits [255:224] | 0x00000000 |

The cRAM registers may be read from or written to using a well-defined interface, such as a simple standard bus interface, using Address, Data, and Write enables, as is well-known per se to circuit designers. All registers are memory mapped as 32-bit registers, so address bits A[1:0] are not present. The command interface consists of address A[7:2], input data Din[31:0], write enable WE, and output data Dout [31:0] The cRAM command register, 404 in FIG. 4, defines the key management commands issued by the command interface. The READ command reads the key entry from the key RAM specified by the designated algorithm/key pair. The WRITE command adds a key entry to the index and key RAMs. The DELETE command removes an entry from the index and key RAMs. The ZEROIZE command clears all entries related to a particular channel. The cRAM command register definition is shown in the following table.

| Bit | Name | Description |
| --- | --- | --- |
| 31:17 | | Reserved |
| 16:7 | KEY | Key Select: used by READ, WRITE, DELETE |
| 6:4 | CHANNEL | Channel: used by READ, WRITE, DELETE, ZEROIZE |
| 3 | ZEROIZE | Zeroize Channel Entries from Index and Key RAMs |
| 2 | DELETE | Delete Channel/Key from Key Register Contents |
| 1 | WRITE | Write Channel/Key with Key Register Contents |
| 0 | READ | Read Channel/Key |

The cRAM key registers, shown as 405 in FIG. 4, are used to store incoming keys to be written using the WRITE command, and store outgoing keys to be read using the READ command. Each register contains 32-bits of data corresponding to a portion of the 256-bit key. Eight registers are used in the preferred embodiment of FIG. 4, thus a 256-bit key is produced, but any number of registers may be employed, for example a 512-bit key could be stored and would require sixteen cRAM key registers. In the case of a WRITE, the key to be written must be loaded in the key register before the command is issued via the command register. In the case of a READ, the key to be read will be available in the key register two cycles after the command is issued via the command register.

Further regarding the input interface of the present invention, in the present invention, as referenced by the figures, there are two input interfaces from the cryptosystem. The command interface, e.g. command interface 310 (READ, WRITE, DELETE, ZEROIZE) and the UPDATE interface, e.g. update interface 360. The command interface uses the standard bus interface. The update interface uses a specialized interface (CH.KREQ, CH.IKS, CH.KGNT). Note the update interface can have many instantiations, all arbitrated by the rotating priority queue, while the command interface is a single interface.

The UPDATE interface 360 of the present invention is used to issue UPDATE commands in the cryptographic or encryption core system, signaling when a new key needs to be updated for processing by a particular channel, in a multi-channel environment. Each of the eight channels (in general any number of update channels may be used) is provided with a separate interface to allow simultaneous requests for key updates. The individual channel key request/grant interfaces consist of key request WCH.KREQ, input key select WCH.IKS[9:0], and key grant WCH.KGNT. The format of these commands are implementation specific, IKS and KREQ/KGNT are handshake signals (input key select, key request, and key grant). Any number of channel key requests may be active at once, and are prioritized using a rotating priority queue, rotating priority queue 359 in FIG. 3A. Each channel key request must remain active until the cryptographic core has issued a corresponding channel key grant. There is no grant request until the underlying algorithm is finished processing any data using a previous key, thus it is empty of queued data. Channel key grants are issued once the new key has been incorporated into the active algorithm. This requires that the appropriate channel processing queue is empty, and the new key has successfully been loaded into the cryptographic core. Upon receipt of a channel key grant, the channel key request must be removed at the end of the cycle, or the subsequent request will be handled as a new request and placed back into the rotating priority queue. It is evident from the input interface definition that a cryptosystem may issue a channel key request for a key UPDATE command at any time, and may not push data requiring the new key to the cryptographic core, until the cryptographic core has issued a channel key grant.

Regarding details for the Rotating Priority Queue 359 of the present invention, the cryptographic core provides eight channel input interfaces for key UPDATE commands, and a command interface for key READ, WRITE, DELETE, and ZEROIZE commands. Each of these nine interfaces must be merged to a single interface to control the index and key RAMs. The Rotating Priority Queue 359 incorporates the fact that a channel may not be released until the corresponding cryptographic core data queue is empty, and the updated key has been fully loaded into the cryptographic core. As such, control of the index and key RAMs still behaves on a single cycle low latency basis while assuring that no channel is starved, and that no commands are blocked if other channels are not issuing commands. However, subsequent requests cannot be issued until the channel grant has returned indicating the command is complete.

Regarding details for the Index/Key RAMs of the present invention, the interface to the index and key RAMs is dependent on the prioritized request coming from the command rotating priority queue. The index RAM is controlled directly by the output of the command queue. The index RAM interface consists of address A[12:0], data input Din[9:0], write enable WE, and data output Dout[9:0]. These sizes are based on an 8 channel×1024 entry index RAM and a 1024 entry key RAM. It should be understood by those skilled in the art that eight channels in a preferred embodiment of the invention is implementation specific, and in general can be another number based on the determined index RAM and key RAM size requirements. Upon receipt of a command from the command rotating priority queue, the address, write enable, and data input are set appropriately. The index RAM data output acts as a pointer into the key RAM, locating the dynamically allocated key. The key RAM is controlled directly by the output of the index RAM. The key RAM interface consists of address A[9:0], data input Din[255:0], write enable WE, and data output Dout[255:0]. The data output of the index RAM is used to address the key RAM. The data output of the key RAM is registered in the key register for the selected channel and presented to the second rotating priority queue 351 for key processing in the cryptographic core.

A second rotating priority queue instantiation, rotating priority queue 351, is normally placed after the key RAM and key registers to pick which cryptographic core channel gets to request an UPDATEd key next. The same concept described herein as per the first queue as to fairness and no blocking is performed. All references to wide and narrow channels can simply be made to cryptographic key outputs going to the cryptographic core for processing. The width is entirely dependent on the instantiation of the width in the key RAM (256 bits in a preferred embodiment of the present invention termed the Gigabit Encryptor).

Since sequential RAMs essentially provide a pipelined structure, UPDATE commands from the input interface may be processed every cycle, with the data pipelined through the RAMs and channel key registers. In the case of command interface READ, WRITE, DELETE, and ZEROIZE commands, both RAMs must be dedicated to the command, and UPDATE requests are held. This functionality is controlled automatically by the command rotating priority queue.

Output from the cRAM cryptographic key manager is controlled by a simple request/strobe interface. When the cryptographic core is ready to process a new key it will issue a request corresponding to a particular input channel (CH.IKREQ), interface 363 in FIG. 3B. Any number of requests may be active at once, and are prioritized using the rotating priority queue logic. Once selected, the highest priority requested input channel will present its key on the cryptographic key output line sourced from the appropriate key register (3B, 350), and issue a multi-cycle channel strobe response (e.g., CH.IKSTB at interface 363).

The cRAM output interface consists of a multi-cycle strobe output issued immediately based on the result of the rotating priority queue. For example, in a cryptosystem implementing 256-bit keys on a 128-bit bus, the strobe output may be issued for up to two cycles. The first strobe presents bits [127:0] of the requested key, and the second strobe presents bits [255:128] of the key. For a cryptosystem implementing 256-bit keys on a 64-bit bus, the strobe output may be issued for up to four cycles. The first cycle presents bits [63:0] of the requested key, followed by bits [127:649], [191:128], and [255:192] for subsequent strobes. The cryptographic core may remove the channel request at any time during the strobe cycles indicating that it has accumulated sufficient data for processing. For example, a cryptographic core with 128-bit interface within the cryptographic core may remove the channel request after the first strobe cycle indicating that only 128 bits of key data were needed.

Although the present invention has been described in terms of the preferred embodiments above, numerous modifications and/or additions to the above-described preferred embodiments would be readily apparent to one skilled in the art. It is intended that the scope of the present invention extends to all such modifications and/or additions and that the scope of the present invention is limited solely by the claims set forth below.

We claim:

1. A system for implementation in a computing device for cryptographic key management comprising:
   a key manager for at least one cryptographic channel employing cryptographic data, said key manager having memory that contains pointers to memory that contain cryptographic data used by said cryptographic system, said memory comprises a first RAM memory and a second RAM memory; said first RAM memory comprising an index RAM containing said pointers to said second RAM memory; said cryptographic data comprising cryptographic key data; and, said second RAM memory comprising a key RAM containing said key data used by said cryptographic system, said key manager including a command interface for issuing commands to said memory, said commands being selected from a group of commands including: READ, DELETE, WRITE, and ZEROIZE;
   a stack storage structure, the stack storage structure being connected to the second RAM memory, the stack being configured for managing free location memory in said second RAM memory, said free location memory comprising memory free of key data; and
   a control unit, the control unit being connected to the second RAM memory and the stack storage structure, the control unit being configured for scanning said second memory to locate free location memory, and when said free location memory has been located, the control unit is further configured for providing an address associated with said free location memory to the stack storage structure, said stack storage structure implementing a Last In First Out (LIFO) storage mechanism, wherein the address associated with said free location memory is stored in said stack storage structure as a next accessible item of said stack storage structure, said scan of said second memory being performed as a background task when no active commands from a user of said system are being processed by the system, wherein said control unit is a dedicated controller and, when a DELETE command is received by the system and an address is deleted from said index RAM, said control unit is further configured for automatically providing the deleted address to said stack storage structure.

2. The system of claim 1, further comprising:
   a plurality of cryptographic channels, said key manager managing said plurality of channels and each of said channels associated with a cryptographic key.

3. The system according to claim 1 wherein:
   said plurality of channels contain a plurality of cryptographic algorithms, with a unique algorithm per channel, with the keys of said cryptographic algorithms stored in said index RAM according to a resizable allocation of memory.

4. The system according to claim 2, further comprising:
   a priority queue, said key manager managing said plurality of channels by giving priority to a predetermined channel received by the key manager from said plurality of channels via said priority queue.

5. The system according to claim 4, further comprising:
   a second priority queue to receive the output from said key RAM of said key manager, said second priority queue takes the output from said plurality of cryptographic channels, prioritizes the output of said cryptographic channels, and services the highest priority request for a new key, said second priority queue having a data queue and said second priority queue not releasing said cryptographic channel until the data queue is empty;
   an update interface for issuing UPDATE commands signaling when a new key needs to be updated for processing by a particular predetermined channel.

6. A method for cryptographic key management via a cryptosystem comprising the steps of:
   storing addresses of a first set of cryptographic keys in a first memory, said addresses comprising pointers to said cryptographic keys, the first memory being an index RAM memory;
   storing said cryptographic keys in a second memory, the second memory being a key RAM memory;
   accessing said pointers in said first memory in order to access the cryptographic keys stored in said second memory;
   scanning said key RAM memory for a free memory location, wherein said scan of said key RAM memory is performed by an autonomous control unit of the cryptosystem and is performed as a background task when no active commands from a user of said cryptosystem are being processed by the cryptosystem;

when a free memory location is found by said scan, providing an address associated with the free memory location to a stack storage structure of the cryptosystem, the stack storage structure implementing a Last In First Out (LIFO) storage mechanism, wherein the address associated with the free memory location is a next accessible item of the stack storage structure;

providing a WRITE command to the index RAM memory and the key RAM memory;

accessing the address associated with the free memory location from the stack storage structure;

writing a second set of cryptographic keys into the free memory location of said key RAM memory; and removing the address associated with the free memory location from the stack storage structure, wherein said method creates an algorithm agile and key agile cryptographic key management system.

7. The method according to claim 6, further comprising the steps of:

storing keys in said index RAM according to a resizable allocation of memory, said resizable allocation of memory limited by the size of said index RAM.

8. The method according to claim 6, further comprising the steps of:

giving priority to a predetermined channel from a plurality of channels input into said memories via a priority queue;

signaling when a new key needs to be updated for processing by a particular channel included in the plurality of channels via an UPDATE command;

prioritizing a request from a cryptographic core for key data output from said memories for a predetermined channel, via a second priority queue; and releasing a predetermined channel only when a data queue in the second priority queue is empty and key data associated with the data queue has been fully loaded into the cryptographic core requesting the key data.

* * * * *